United States Patent [19]
Buck

[11] Patent Number: 4,596,168
[45] Date of Patent: Jun. 24, 1986

[54] AXIALLY-LOCATED BAR PULLER

[76] Inventor: James R. Buck, 1207 SE. Tenth St., Cape Coral, Fla. 33904

[21] Appl. No.: 694,880

[22] Filed: Jan. 25, 1985

Related U.S. Application Data

[63] Continuation-in-part of Ser. No. 519,630, Aug. 2, 1983, abandoned.

[51] Int. Cl.[4] .................................................. B23B 13/12
[52] U.S. Cl. ............................................ 82/2.5; 82/38 R; 279/16; 414/14
[58] Field of Search .................... 82/2.5, 2.7, 38 R; 414/14, 17; 279/1 Q, 41 A, 46 A

[56] References Cited

U.S. PATENT DOCUMENTS

| | | | |
|---|---|---|---|
| 2,402,714 | 6/1946 | Wald | 279/16 |
| 2,426,200 | 8/1947 | Green | 279/1 Q |
| 3,448,988 | 6/1969 | Athanasiou | 279/1 Q |
| 3,576,144 | 4/1971 | Strah | 82/38 R |
| 3,640,442 | 2/1972 | Lyon | 279/1 Q |
| 3,664,215 | 5/1972 | Selby | 82/2.5 |
| 3,691,879 | 8/1972 | Blake | 414/14 |

Primary Examiner—Leonidas Vlachos
Attorney, Agent, or Firm—Flynn, Thiel, Boutell & Tanis

[57] ABSTRACT

A bar puller adapted for mounting on a machine tool, such as a turret lathe, for engaging and pullingly advancing a workpiece bar. The bar puller has a compact cup-shaped housing provided with a stub shaft which mounts in the turret. The cup-shaped housing has a bore opening outwardly through the free end thereof, and an elastomeric grippping sleeve unit is closely fitted and seated within the bore, which sleeve unit projects axially beyond the free end of the housing. A nut threadably engages the housing and has an abutment wall which radially overlaps and axially engages the exposed axial end of the gripping sleeve. Rotation of the nut relative to the housing causes axial compression of the sleeve unit, whereby the latter elastically deforms radially inwardly so as to grippingly engage the workpiece bar as inserted into the central opening thereof.

12 Claims, 4 Drawing Figures

AXIALLY-LOCATED BAR PULLER

CROSS-REFERENCE TO RELATED APPLICATION

This application is a continuation-in-part of my co-pending application Ser. No. 519 630 filed Aug. 2, 1983, now abandoned.

FIELD OF THE INVENTION

This invention relates to an improved bar puller adapted to be mounted on a machine tool, such as the turret of a lathe, for engaging and advancing a bar or workpiece by means of a pulling movement.

BACKGROUND OF THE INVENTION

The forward advancing of a workpiece, specifically a bar, through a lathe to permit sequential working operations to be performed has generally been accomplished utilizing a push-type mechanism, commonly referred to as a bar pusher. The standard bar pusher typically comprises a sleevelike element formed substantially as a collet, that is, the sleeve has slots extending axially inwardly from one end thereof so that the sleeve defines a plurality of resilient spring fingers. The sleeve is typically constructed of steel and hence the spring fingers deflect to permit engagement with a bar or workpiece when advancing of same is desired. This standard bar pusher is normally positioned on the rearward or back side of the lathe collet so as to engage the workpiece and push same forwardly. However, due to the size and mass of the bar being advanced, which bar may be as much as 12 feet in length, each stoppage of the pusher results in imposition of a substantial impact force on the lathe, and hence this significantly increases the wear and tear on the lathe.

To avoid use of the spring steel collet as a pusher, another bar pusher has been developed which utilizes a steel-capped rubber insert captivated within a finger sleeve, which rubber insert is squeezed to deform same into gripping engagement with the bar so as to permit gripping engagement therewith and hence advancing of the bar. With this known pusher, as manufactured by Green (see U.S. Pat. No. 2,426,200), the pusher is again positioned on the back side of the collet. Also, this pusher is of undesirable axial length, and cannot be easily manually adjusted.

While the use of bar pushers for advancing the bar or workpiece has been conventional and well known for many years, nevertheless the known bar pushers do cause excessive wear and tear on the machine, and are relatively expensive in view of the requirement that they be positioned on the back side of the collet. Further, many of the known bar pushers have not possessed any significant adjustability with respect to the gripping force which is imposed on the bar during the advancing thereof.

In an attempt to overcome the disadvantages associated with conventional bar pushers, one manufacturer, Advance Tool Systems, has developed a bar puller which mounts on the front side of the machine. In particular, this known bar puller mounts on the turret of a lathe, and hence can be advanced into engagement with the bar, and then retracted to permit advancing of the bar stock. With this known bar puller, there is provided a straight shank which is adapted for engagement with the turret, which shank has a threaded holder on one end which engages the threaded end of a standard split spring-type pusher sleeve, which sleeve in this instance is used as a puller. This known puller, however, possesses many of the same disadvantages associated with conventional pushers. That is, it again utilizes a split metal sleeve so as to define spring fingers, and the arrangement hence does not possess the desired level of adjustability. Also, it will readily scratch or mar soft or ground materials.

Accordingly, it is an object of this invention to provide an improved bar puller adapted for mounting on machines, specifically numerically controlled lathes, for advancing a bar or workpiece, which puller overcomes many of the disadvantages associated with known pushers and pullers.

More specifically, this invention relates to an improved puller which is structurally and operationally simple, is compact in size, particularly of short axial extent, is adjustable (including manually) to readily accommodate bars having a substantial range of sizes, is capable of efficiently advancing the bar or workpiece without subjecting the machine to excessive impact loads or stresses, is capable of operating for long periods of time while experiencing only minimum wear, and is relatively inexpensive to construct.

The improved bar puller of this invention specifically includes a holder which comprises a cuplike support having a shank projecting axially therefrom, which shank is adapted for engagement within a machine tool support, such as a lathe turret. The cuplike holder has a bore which opens outwardly through one end thereof, and a gripping unit is removably positioned within this bore. The gripping unit comprises an elastomeric sleeve having metal end plates mounted on opposite ends thereof, one of which bears against a shoulder disposed at the inner end of the bore, and the other of which projects outwardly beyond the open end of the bore. An actuator is threadably engaged on the free end of the holder and has a radially inwardly projecting flange which engages the end plate associated with the exposed end of the grip unit. By suitably adjustably threading the actuator onto the holder, the grip unit is axially compressed so as to effect elastomeric deformation of the sleeve to enable it to grippingly engage a bar which can be inserted into the opening defined by the grip unit.

With the improved bar puller of this invention, the actuator can be suitably adjusted so as to regulate and control the deformation of the grip unit, and hence the gripping engagement on the bar, from outside the machine both when the machine is running and when stopped. Further, this grip unit will successfully engage and advance even short bars without the need for an extra pusher bar, and when wear of the grip unit is experienced, then the actuating nut can be removed from the holder so that the grip unit can be axially reversed within the holder so as to extend the useful life thereof.

With this improved bar puller, proper gripping can be achieved even with bars of extremely small cross-sectional area, such as bars having a diameter of one-fourth inch or smaller. The bar puller can also be properly tightened for gripping engagement with bars having a noncircular cross section, such as hexagonal bars. In one modification of this bar puller, the bar puller is provided with an anti-friction bearing between the gripping unit and the support shank so as to permit a bar to be utilized in conjunction with a rotating spindle without requiring complete stoppage of the spindle rotation.

These and other objects of the invention will be apparent to persons familiar with structures of this general type upon reading the following specification and inspecting the accompanying drawings.

Figure 1:
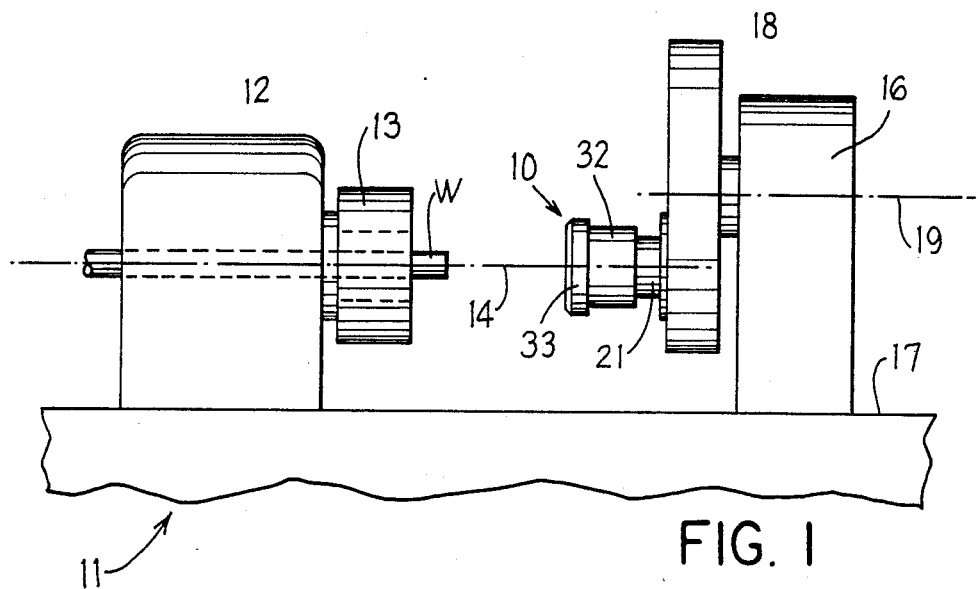
FIG. 1 is a diagrammatic, fragmentary illustration of a turret lathe having a bar puller according to the present invention mounted thereon.

Certain terminology will be used in the following description for convenience in reference only, and will not be limiting. For example, the words "upwardly", "downwardly", "leftwardly" and "rightwardly" will refer to directions in the drawings to which reference is made. The words "inwardly" and "outwardly" will refer to directions toward and away from, respectively, the geometric center of the structure and designated parts thereof. Said terminology will include the words specifically mentioned, derivatives thereof, and words of similar import.

DETAILED DESCRIPTION

Figure 2:
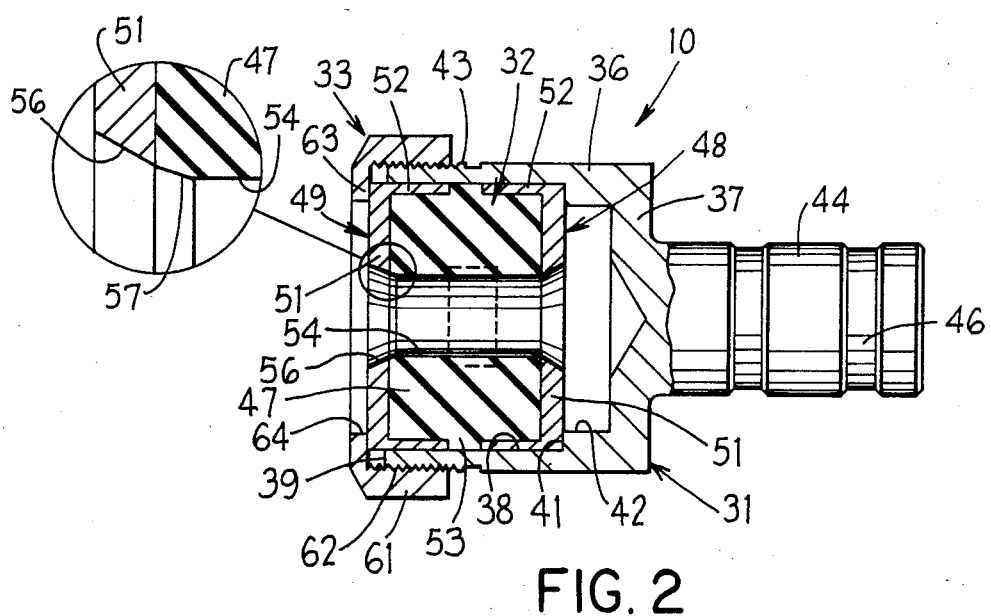
FIG. 2 is an enlarged, partial sectional view of one embodiment of the improved bar puller of this invention.
Figure 3:
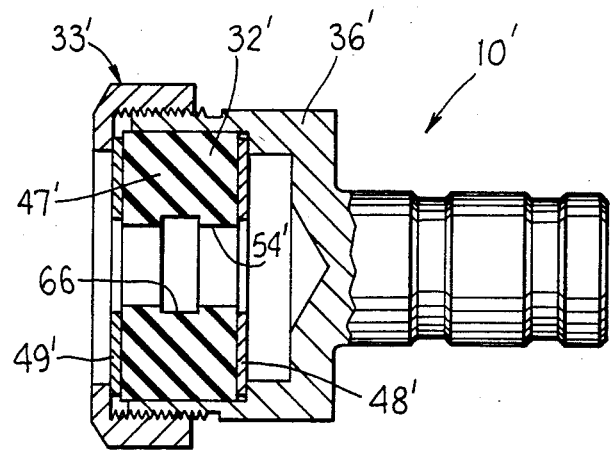
FIG. 3 is a sectional view similar to FIG. 2 but illustrating a second embodiment of the improved bar puller of this invention.
Figure 4:
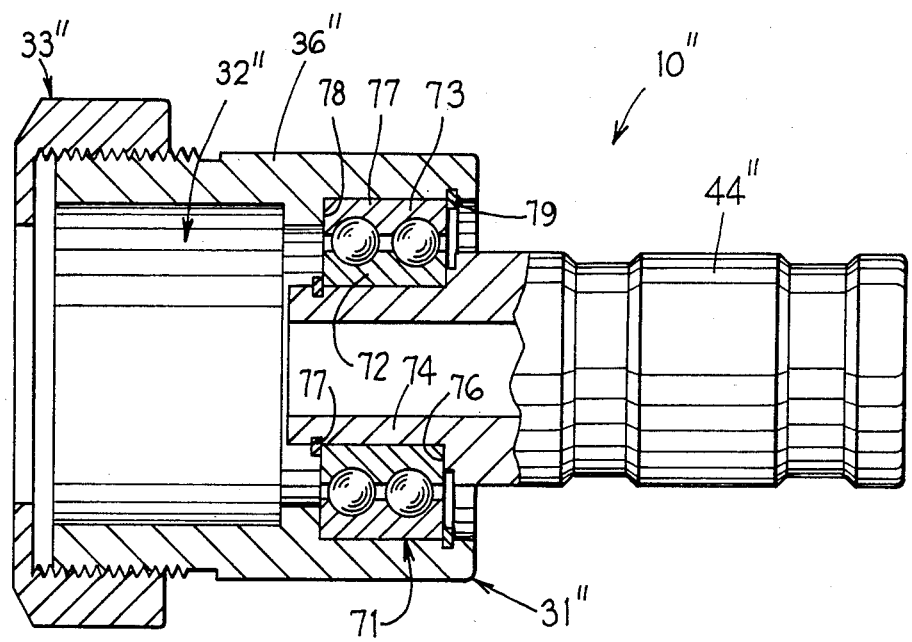
FIG. 4 is a sectional view illustrating a third embodiment of the improved bar puller.

The improved bar puller of this invention, embodiments of which are illustrated by FIGS. 2-4, is intended for mounting on a machine tool, such as a turret lathe 11 as diagrammatically illustrated in FIG. 1.

The lathe 11 includes a headstock having a motor 12 which rotatably drives a conventional chuck or collet 13 for rotation about an axis 14. The chuck or collet 13 is designed for gripping engagement with a workpiece W, which workpiece in the illustrated embodiment comprises an elongated bar which extends through the headstock and through the chuck so as to project outwardly therefrom to permit selected machining operations to be carried out thereon.

The lathe 11 also includes a tailstock or turret support 16 which is slidably supported on horizontally elongated ways 17 so that the turret support 16 can be slidably moved toward and away from the workpiece W in a conventional manner. This turret support 16 rotatably mounts thereon a turret 18 supported for rotation about a substantially horizontal axis 19 which extends parallel to but is offset from the axis 14. Turret 18, as is conventional, is provided with a plurality of hubs or holders 21 mounted eccentrically thereon in a circular pattern therearound so as to permit various cutting tools and the like to be mounted on the turret and positioned for engagement with the workpiece W. One of these holders 21 is utilized for mounting thereon the bar puller 11, whereby the bar puller when disposed in an operative position is hence coaxially aligned with the workpiece W so as to be movable axially into engagement therewith.

Referring now to the embodiment of FIG. 2, the bar puller 10 is formed of three basic components, namely the holder 31, a grip insert 32 and an actuating nut 33.

The holder 31 includes a substantially cup-shaped portion which defines a substantially cylindrical sleeve 36 which is open at one end and which is closed by an end wall 37 at the other end. A first substantially cylindrical bore 38 opens inwardly from the free end 39 of the sleeve and extends axially over a major portion of the length of the sleeve 36. This first bore 38, which is defined by a smooth and uniform interior cylindrical surface as formed on the sleeve, terminates in an annular shoulder 41 which projects radially inwardly of the bore. A second bore 42, which is of smaller diameter than the first bore 38, projects coaxially inwardly from the first bore beyond the annular shoulder 41. This second bore 42 is of limited axial extent and terminates at the end wall 37.

To permit mounting of the bar puller on the lathe turret, the holder 31 includes a substantially cylindrical stub shaft 44 of reduced diameter fixed to and projecting coaxially away from the end wall 37. This stub shaft 44 has one or more annular grooves 46 disposed in encircling relationship therearound for accommodating set screws or other similar holding devices when the grip holder 31 is positioned within the turret holder 21.

The grip insert 32 is formed primarily by means of an annular elastomeric sleeve 47 having an exterior cylindrical configuration. This elastomeric sleeve 47 has metal plates 48 and 49 secured on the opposite axial ends thereof, which plates 48 and 49 in this embodiment are formed as cuplike caps. Each of these caps 48 and 49 includes an end wall 51 which radially overlaps the axial end face of the elastomeric sleeve 47, and each cap 48 and 49 also has a cylindrical sleevelike skirt 52 which projects axially from the respective end wall 51 and closely snugly surrounds the cylindrical periphery of the elastomeric sleeve 47. The skirts 52 of the caps 48 and 49 do not overlap, but are axially spaced from one another whereby a portion 53 of the elastomeric sleeve 47 is disposed therebetween and hence effectively defines part of the exterior cylindrical periphery of the grip unit.

The grip unit 32 has a cylindrical opening 54 extending coaxially therethrough, which opening is of a diameter selected in accordance with the diameter of the workpiece or bar W. The opposite ends of this opening 54 are preferably flared or tapered, as at 56, to facilitate entry of the leading end of the workpiece W into the opening 54. As illustrated by FIG. 2, the cap end walls 51 project radially inwardly through an extent substantially equal to the radial extent of the elastomeric sleeve 46, and hence the tapered surfaces 56 defining the inlets at the opposite ends of the opening 54 are hence defined on these end walls 51. However, a slight taper 57 is also formed on the sleeve 47 at the end of the opening 54.

The elastomeric sleeve 47 is preferably constructed of a rubberlike material which is relatively hard but still possesses substantial elastomeric deformation. For example, the sleeve 47 is preferably made of Nitrile rubber having a Durometer of about 70.

The grip unit 32, when in a nondeformed condition, has an axial length which slightly exceeds the axial depth of the first bore 38. The outer diameter of this grip unit 32 substantially equals the diameter of the first bore 38, whereupon the grip unit can be slidably inserted into the bore 38 so as to abut against the shoulder 41, whereupon the other end of the grip unit projects axially outwardly beyond the free end 39. This hence positions the grip unit for engagement with the actuating nut 33 so as to permit the desired compression, and hence deformation, of the grip unit. Further, the outer diameter of the grip unit 32 substantially equals or slightly exceeds the axial length thereof. In fact, the outer diameter is preferably about 1.2 to 1.5 times the axial length.

The actuating nut 33 is formed basically as a cup-shaped member having a substantially cylindrical skirt or sleeve 61 which is of larger diameter so as to concentrically surround the sleeve 36. The sleeve 61 is internally threaded at 62 so as to be threadably engageable on and in surrounding relationship to the external threads 43 formed on the insert holder 31. These external threads 43 concentrically surround and axially overlap the grip unit 32. The skirt 61 is fixed, here integrally, to an annular base wall or flange 63 which projects radially inwardly so as to radially overlap the end wall 51 of the cap 49. This base wall 51 is normally provided with an enlarged opening 64 extending therethrough. The external surface of sleeve 61 is knurled to permit manual gripping thereof.

This configuration of the actuating nut 33, and its external and concentric threaded mounting on the free end of the holder 31, hence enables the overall axial length of the puller 10 to be minimized, and also permits simple manual adjustment of the puller.

OPERATION

The operation of the bar puller 10 according to this invention will be briefly described to ensure a complete understanding thereof.

When advancing of the bar or workpiece W is desired, which advancing occurs rightwardly in FIG. 1, then the turret 18 is rotated about axis 19 until the puller 10 is stationed so as to be coaxially aligned along the axis 14. The puller 10 is initially prepositioned so that the nut 33 compresses and radially deforms the grip unit 32 so that opening 54 is slightly smaller than the workpiece diameter. The turret support 16 is then slidably displaced leftwardly on the ways 17 until the workpiece W projects into the opening 54. Since workpiece W is normally slightly larger than the deformed diameter of opening 54, the insertion of workpiece W into opening 54 causes limited radial outward deformation of the sleeve 46, and hence creates a gripping engagement with the periphery of the workpiece over a substantial extent, which extent is along a major portion of the length of the opening 54. Chuck 13 is then released so as to grippingly disengage the workpiece, and the turret support 17 is then slidably moved rightwardly along the ways, thereby pulling and hence advancing the workpiece W rightwardly through the desired extent, following which the chuck 13 again grippingly reengages the advanced workpiece. The turret support 16 then moves further rightwardly so that the bar puller is wholly removed from the workpiece, following which the turret 16 is rotated so as to position the desired tool at the working location to permit performance of the desired operation.

The installation of the puller 10 on the turret 18 is accomplished merely by inserting the stub shaft 44 into one of the turret holders 21, which stub shaft 44 is secured to the turret holder in any conventional manner, such as by set screws engaged within the slots 46.

When it is desired to utilize the puller on different diameter workpieces, then the cap 33 is removed, following which the grip unit 32 is removed and replaced by a similar grip unit 32 having a different diameter opening 54 therethrough. Similarly, when the grip unit 32 has undergone substantial wear, it can be easily replaced in the same manner, or alternately the grip unit 32 can be axially reversed end-for-end within the bore 38 so as to increase the life of the unit.

The embodiments illustrated by FIGS. 3 and 4 will now be described using the same reference numerals as appearing in FIG. 2 to designate the corresponding parts but with the addition of a ' or " thereto, respectively.

The bar puller 10' of FIG. 3 is particularly desirable for use with bars of rather small diameter, such as in the range of one-eighth inch to one inch. The elastomeric sleeve 47' associated with the grip unit 32' is, in contrast to that of the FIG. 2 embodiment, provided with an outside diameter which substantially exceeds the axial length of the sleeve. In fact, the outside diameter of the sleeve 47' is preferably equal to or greater than twice the axial length of the sleeve.

The grip unit 32' is again provided with thin metal end plates 48' and 49', which end plates in this embodiment are disposed so as to solely radially overlap the axial end surfaces of the sleeve 47'. For this purpose, the end plates 48' and 49' have inner and outer diameters which are substantially equal to and generally only slightly smaller than the inner and outer diameters, respectively, of the sleeve 47'. The end plates are secured, as by being adhesively bonded, to the axial end faces of the sleeve 47'. These end plates 48' and 49' do not, however, surround the outer cylindrical wall of the sleeve, this latter wall being unrestrained by the end plates so that the outer sleeve wall can expand radially outwardly for gripping engagement with the surrounding support sleeve 36' over substantially the full axial extent of the elastomeric sleeve 47'. This shorter axial length of the elastomeric sleeve 47' in relationship to its diameter, coupled with the provision of the end plates 48' and 49' disposed for engagement solely with the axial end faces of the elastomeric sleeve, makes this embodiment particularly desirable for creating a secure gripping engagement with a bar of small diameter, such as one inch or less, and including extremely small diameter bars such as one-fourth inch or less.

The elastomeric sleeve 47' is also provided, as illustrated by FIG. 3, with a relief groove 66 which is formed internally thereof in surrounding relationship to the bore or opening 54'. This relief groove 66 is positioned internally of the sleeve 47' substantially midway between the axial end faces thereof and opens radially outwardly in open communication with the central opening or bore 54'. Relief groove 66 is preferably of significant axial length but is of only shallow radial extent. It has been observed that when a bar is inserted into the bore 54' of the elastomeric sleeve, which bar normally has a cross-sectional area closely conforming or sometimes even slightly exceeding the cross-sectional area of the bore 54', the bar effects sufficient deformation and distortion of the elastomeric material so as to create a wave of elastomeric material which tends to move axially along ahead of the free end of the bar, which wave of elastomeric material makes insertion of the bar more difficult, and in fact tends to eject the bar from the elastomeric sleeve. Provision of the relief groove 66 has been discovered to substantially minimize this wave effect and hence greatly facilitate insertion of the bar into the bore 54'.

While the relief groove 66 is illustrated in the bar puller 10' of FIG. 3, this relief groove is also highly desirable for incorporation into the bar puller 10 of FIG. 2 as illustrated by dotted lines.

In addition to the improved ease of inserting a bar into the elastomeric sleeve as a result of the provision of the relief groove 66', this groove is also believed to assist in providing an improved gripping of the bar. For example, when the bar puller is tightened by rotation of the nut 33' so as to effect axial compression of the grip insert, this causes radial inward expansion of the elastomeric sleeve 47' in the same manner as described above relative to FIG. 2. However, due to the presence of the relief groove 66, the gripping of the sleeve 47' with the bar due to the radial inward expansion of the elastomeric sleeve occurs more dominantly adjacent the opposite axial ends of the sleeve, that is, on opposite axial sides of the relief groove 66. This results in the defining of two fairly pronounced annular areas which are axially spaced and which each expand radially inwardly to create a very secure gripping of the bar at two axially spaced locations.

With this embodiment of FIG. 3, the fact that the end plates 48' and 49' do not circumferentially surround the elastomeric sleeve also provides an outer circumferential wall of greater axial extent which is free of surrounding restraint, except for the housing sleeve 36', so that the sleeve is able to more readily radially expand for gripping engagement with the housing sleeve, and hence the elastomeric sleeve has the ability to be tightened to a significantly greater amount, thereby enabling it to tightly grip even extremely small diameter bars.

Other than the differences discussed above, the bar puller 10' of FIG. 3 otherwise structurally and operationally corresponds to the bar puller 10 of FIG. 2 so that further explanation thereof is believed unnecessary.

Referring now to FIG. 4, there is illustrated a bar puller 10" which basically corresponds to the pullers 10 or 10' discussed above. In the puller 10", the holder 31" again has a grip insert 32" positioned within the support sleeve 36", the latter having the adjusting nut 33" threadably engaged with one end thereof. A stub shaft 44" again coaxially projects outwardly from the other end of the support sleeve 36". This support shaft 44" and support sleeve 36" are, however, in this embodiment, supported for relative rotation with respect to one another due to the provision of a conventional anti-friction bearing 71 being disposed therebetween. The anti-friction bearing is, in the illustrated embodiment, a conventional roller bearing having bearing elements, specifically balls, confined between inner and outer races 72 and 73, respectively. The inner race is securely seated on a reduced diameter stub shaft portion 74 which projects inwardly from the stub shaft 44" concentrically within the support sleeve 36". The inner race 72 seats against a shoulder 76 associated with the stub shaft, and an appropriate retaining ring 77 confines the other end of the inner race. In similar fashion, the outer race 73 is seated within an inner bore 77 formed in the rearward end of the support sleeve 36" so that the outer race abuts against an annular shoulder or flange 78, and an appropriate retaining ring 79 confines the other end of the outer race. This relationship permits the support sleeve 31" and the insert 32" therein to be rotatably supported with respect to the support shaft 44", and at the same time this bearing 71 permits substantial axial thrust to be transmitted from the support sleeve 36" through the bearing to the shaft 44" due to the axially opposed shoulders 76 and 78 which respectively engage opposite ends of the inner and outer races.

The insert 32" may have the configuration illustrated by either the insert 32 of FIG. 2 or the insert 32' of FIG. 3, depending upon the size of the bar and the mode of usage, so that further illustration thereof in FIG. 4 is believed unnecessary.

The bar puller 10" of FIG. 4 operates in the same manner as those described above. In addition, however, the presence of the bearing 71 enables the bar puller to be used in conjunction with a machine tool on which the spindle is rotating so that bars can be inserted or removed without requiring stoppage, or at least without requiring complete stoppage, of the rotation of the machine tool spindle.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A bar puller adapted for mounting on a machine tool for engaging and pulling on a bar for advancing the latter axially of the machine tool, said bar puller comprising:

a holder having a support part defined by a base wall and a substantially cylindrical skirt which is secured to said base wall and projects axially therefrom, and mounting shaft means mounted on said support part and projecting coaxially therefrom in the opposite direction from said skirt;

said skirt being externally threaded adjacent the free end thereof, said cup-shaped part defining within said skirt a substantially cylindrical bore of uniform diameter which opens outwardly through the free end of said skirt, said bore extending axially between said free end and an annular shoulder formed internally of said skirt;

a nut having an internally threaded sleeve portion disposed in surrounding relationship to said skirt and being threadably engaged with the external threads thereon, said nut also having an annular end wall which projects radially inwardly from said sleeve portion adjacent but axially spaced outwardly from the free end of said skirt, said end wall projecting radially inwardly beyond said skirt a selected radial extent so as to radially overlap at least a portion of said bore, said radial end wall defining thereon an inner axial abutment surface which is disposed in opposed relationship to said shoulder; and a gripping sleeve unit disposed within said bore and projecting axially outwardly at least a small axial extent beyond the free end of said skirt, said sleeve unit being axially confined between said abutment surface and said shoulder for grippingly engaging a workpiece bar and said skirt, said gripping sleeve unit having a central opening extending coaxially therethrough as defined by an inner diameter for accomodating the workpiece bar, said gripping sleeve unit having an outside diameter substantially equal to said bore diameter and at least about 1.2 times its axial length, said gripping sleeve unit including an elastomeric rubberlike sleeve member which defines said central opening extending axially therethrough, said elastomeric rubberlike sleeve member being axially compressed between said shoulder and said abutment surface so that said elastomeric sleeve member elastically deforms both radially inwardly for grippingly engaging the bar which is insertable into the central opening and radially outwardly for grippingly engaging said skirt.

2. A puller according to claim 1, wherein said gripping sleeve unit includes a pair of thin metal end plates fixedly mounted on the opposite axial ends of said elastomeric sleeve member, said end plates being seated on said shoulder and said abutment surface.

3. A puller according to claim 1, wherein said gripping sleeve unit has an outside diameter which is about 1.2 to about 1.5 times its axial length.

4. A puller according to claim 3, wherein said support part has an axial length which is approximately equal to the diameter of said gripping sleeve means.

5. A puller according to claim 4, wherein the gripping sleeve unit has an outside diameter which is at least about two times its axial length.

6. A puller according to claim 5, wherein said gripping sleeve unit includes a pair of thin metal end plates fixedly secured to the opposite axial end faces of the elastomeric sleeve member, said end plates being annular and having inner and outer diameter which approximately correspond to the respective inner and outer diameters of the elastomeric sleeve member, said end plates being seated on said shoulder and said abutment surface, and the elastomeric sleeve member having an annular circumferential external surface which is free of restraint from said end plates.

7. A puller according to claim 1, wherein said holder is formed as a one-piece structure and has said mounting shaft means fixed to said base wall.

8. A puller according to claim 1, wherein said cup-shaped part and said mounting shaft means are supported for relative rotation with respect to one another about the axis of said skirt by anti-friction bearing means cooperatively disposed therebetween.

9. A puller according to claim 8, wherein said anti-friction bearing means includes means for transmitting axial thrust between said mounting shaft means and said cup-shaped part.

10. A puller according to claim 1, wherein said cup-shaped part and said mounting shaft means are separate parts supported for relative rotation with respect to one another, said mounting shaft means projecting through an opening formed through the base wall of said support part so as to project into said cylindrical bore, and antifriction bearing means cooperatively disposed between and supportingly engaged on said mounting shaft means and said skirt.

11. A bar puller adapted for mounting on a machine tool for engaging and pulling on a bar for advancing the latter axially of the machine tool, said bar puller comprising:

a holder having a support part defined by a base wall and a substantially cylindrical skirt which is secured to said base wall and projects axially therefrom, and mounting shaft means mounted on said support part and projecting coaxially therefrom in the opposite direction from said skirt;

said skirt being externally threaded adjacent the free end thereof, said cup-shaped part defining within said skirt a substantially cylindrical bore of uniform diameter which opens outwardly through the free end of said skirt, said bore extending axially between said free end and an annular shoulder formed internally of said skirt;

a nut having an internally threaded sleeve portion disposed in surrounding relationship to said skirt and being threadably engaged with the external threads thereon, said nut also having a wall part which projects radially inwardly from said sleeve portion adjacent the free end of said skirt, said wall portion projecting radially inwardly beyond said skirt a selected radial extent so as to radially overlap at least a portion of said bore, said radial wall part defining thereon an inner axial abutment surface which is disposed in opposed relationship to said shoulder; and a gripping sleeve unit disposed within said bore and axially confined between said abutment surface and said shoulder for grippingly engaging a workpiece bar, said gripping sleeve unit having a central opening extending coaxially therethrough as defined by an inner diameter for accommodating the workpiece bar, said gripping sleeve unit having an outside diameter substantially equal to said bore diameter, said gripping sleeve unit including an elastomeric rubberlike sleeve member which defines said central opening extending axially therethrough, said elastomeric rubberlike sleeve member being axially compressed between said shoulder and said abutment surface so that said elastomeric sleeve member elastically deforms radially inwardly for grippingly engaging the bar which is insertable into the central opening;

said elastomeric sleeve member having an annular relief groove formed internally thereof in surrounding and open communication with said central opening, said relief groove extending radially outwardly from said central opening and also extending axially along said central opening over a substantial extent, said relief groove being positioned axially inwardly from the axial end faces of the sleeve member.

12. A bar puller adapted for mounting on a machine tool for engaging and pulling on a bar for advancing the latter axially of the machine tool, said bar puller comprising:

a one-piece holder which is of a cup-shaped configuration defined by a base wall and a substantially cylindrical skirt which is integrally fixed to said base wall and projects axially therefrom, said skirt being externally threaded adjacent the free end thereof;

said cup-shaped holder defining within said skirt a substantially cylindrical bore of uniform diameter which opens outwardly through the free end of said skirt, said bore extending axially between said free end and an annular shoudler formed internally of said skirt, said annular shoulder being spaced axially outwardly from said base wall;

stub shaft means fixedly mounted on said base wall and projecting coaxially therefrom in the opposite direction from said skirt, said stub shaft means being of significantly smaller diameter than said cylindrical bore;

a nut having an internally threaded sleeve portion disposed in surrounding relationship to said skirt and being threadably engaged with the external threads thereon, said nut having an annular end wall which projects radially inwardly from said sleeve portion adjacent but axially spaced outwardly from the free end of said skirt, said end wall projecting radially inwardly beyond said skirt a selected radial extent so as to radially overlap at least a portion of said cylindrical bore, said end wall defining thereon an inner axial abutment surface which is disposed in opposed relationship to said shoulder;

a gripping sleeve unit disposed within said bore and projecting axially outwardly at least a small axial extent beyond the free end of said skirt, said sleeve unit being axially compressively confined between said abutment surface and said shoulder for grippingly engaging a workpiece bar and said skirt, said gripping sleeve unit having an outside diameter substantially equal to said bore diameter and greater than the axial length of said gripping sleeve unit;

said gripping sleeve unit including an elastomeric rubberlike sleeve member having a central opening extending coaxially therethrough as defined by an inner diameter for accommodating the workpiece bar, said elastomeric rubberlike sleeve member also having an outer annular surface disposed for direct gripping angagement with a surrounding wall defining said cylindrical bore, said elastomeric rubberlike sleeve member being axially compressed between said shoulder and said abutment surface so that said elastomeric sleeve member elastically deforms both radially inwardly for grippingly engaging the bar which is insertable into the central opening and radially outwardly for grippingly engaging the wall defining said bore; and said gripping sleeve unit including a pair of thin metal end plates fixedly secured to the oppoiste axial ends of said elastomeric sleeve member, said end plates being seated on said shoulder and said abutment surface.

* * * * *